United States Patent [19]
Schneider

[11] 3,789,245
[45] Jan. 29, 1974

[54] TERNARY MEMORY CELL

[75] Inventor: Herbert Anton Schneider, Boulder, Colo.

[73] Assignee: Bell Telephone Laboratories, Incorporated, Murray Hill, Berkeley Heights, N.J.

[22] Filed: Dec. 26, 1972

[21] Appl. No.: 318,208

[52] U.S. Cl. .................. 307/288, 307/237, 307/289
[51] Int. Cl. ........................ H03k 3/286, H03k 3/29
[58] Field of Search ... 307/209, 288, 237, 289, 291, 307/238

[56] References Cited

UNITED STATES PATENTS

| | | | |
|---|---|---|---|
| 3,679,914 | 7/1972 | Schneider | 307/288 |
| 3,602,733 | 8/1971 | Aoki | 307/209 |
| 3,010,031 | 11/1961 | Baker | 307/288 |
| 3,668,437 | 6/1972 | Bankovic | 307/288 X |
| 3,697,775 | 10/1972 | Kane | 307/209 |

OTHER PUBLICATIONS

Mrazek, "Tri-State Logic in High-Speed Memories of Microprogrammed Computers," Nat'l Semiconductor Corp. 6/1971; 7 pages.

*Primary Examiner*—Rudolph V. Rolinec
*Assistant Examiner*—L. N. Anagnos
*Attorney, Agent, or Firm*—Donnie E. Snedeker

[57] ABSTRACT

A two-state regenerative circuit comprising two complementary transistor pairs, i.e., a complementary cell is provided with a third state by an arrangement which, in response to a predetermined signal, latches the cell in a state, otherwise unstable, in which both transistor pairs are nonconductive. A switching circuit provides the cell with low output impedance in the third state.

11 Claims, 2 Drawing Figures

TERNARY MEMORY CELL

BACKGROUND OF THE INVENTION

This invention relates to ternary logic, and in particular, to ternary memory cells.

Much of present-day digital logic employs two-state, or binary, logic in which signals representing data typically assume one of two possible voltage or current levels. However, in a number of applications, implementation of three-state, or ternary, logic has been found to be advantageous. Asynchronous computers and controllers are one such application. Telegraphic signaling is another.

A ternary memory cell, or more simply ternary cell, is a circuit adapted for storing one digit of ternary information, i.e., a data signal which assumes for example one of three voltage or current levels. Ternary cells known heretofore generally exhibit a number of undesirable characteristics. For example, the output impedance of known ternary cells, rather than being constant, is often a function of the state in which the cell resides. Output rise and fall times and thus the frequency response of known ternary cells are dependent to a great extent on passive component values. Moreover, the relatively high output impedances exhibited by many known ternary cells results in relatively high internal power dissipation, and output levels which are load-sensitive.

SUMMARY OF THE INVENTION

Accordingly, an object of the invention is to provide an improved ternary cell.

A more specific object of the invention is to provide a ternary cell having output rise and fall times which are to a great extent independent of passive component values.

A further object of the invention is to provide a ternary cell having low output impedance in all three states.

In a known two-state, i.e., binary, regenerative circuit having the above-desirable characteristics, the preceding and other objects are achieved in accordance with my invention by providing the two-state circuit with a third, stable state. The known regenerative circuit, herein referred to as a "complementary cell," comprises two complementary transistor pairs, each of which is conductive in one of the two binary states. The two complementary transistor pairs are interconnected via direct current paths such that, normally, each pair is switched conductive when the other is switched nonconductive. Triggering circuitry responsive to first and second triggering signals switches the cell between its first and second binary states.

According to my invention, a novel circuit arrangement is provided which operates in response to a third triggering signal to switch the conductive one of the two transistor pairs nonconductive and to latch both pairs nonconductive so that they remain nonconductive after termination of the third triggering signal, thereby defining a third, stable state for the cell. The arrangement illustratively includes clamping circuitry responsive to the third triggering signal for clamping the two transistor pairs nonconductive, and further includes latching circuitry normally operative when both pairs are nonconductive for maintaining the clamping circuitry operated.

In accordance with an important aspect of the invention, inhibiting circuitry inhibits normal operation of the latching circuitry, in response to the first and second triggering signals. Thus the cell is unlatched from its third state when it is triggered therefrom into one of the first and second states.

The inhibiting circuitry further operates to prevent the cell from erroneously latching in its third state due to the momentary nonconduction of both transistor pairs which may occur during transitions between the first and second states.

The inhibiting circuitry also advantageously prevents the cell from erroneously latching in its third state in response to concurrent application of first and second triggering signals, which, in the illustrative embodiment, for example, causes both transistor pairs to be nonconductive.

In general, the cell output impedance in the third state, unlike in the binary first and second states, is a function of the internal resistors in the cell and may be undesirably large for certain applications. Advantageously, in accordance with a further feature of the invention, the present ternary cell is provided with a low output impedance in the third state by a switching circuit which operates when the cell is in its third state. The switching circuit connects the cell output terminals via low impedance paths to a source of potential defining the third state output voltage level.

BRIEF DESCRIPTION OF THE DRAWING

A clear understanding of the invention and of the preceding and other objects and features thereof may be gained from consideration of the following detailed description and accompanying drawings in which.

DETAILED DESCRIPTION

Figure 1:
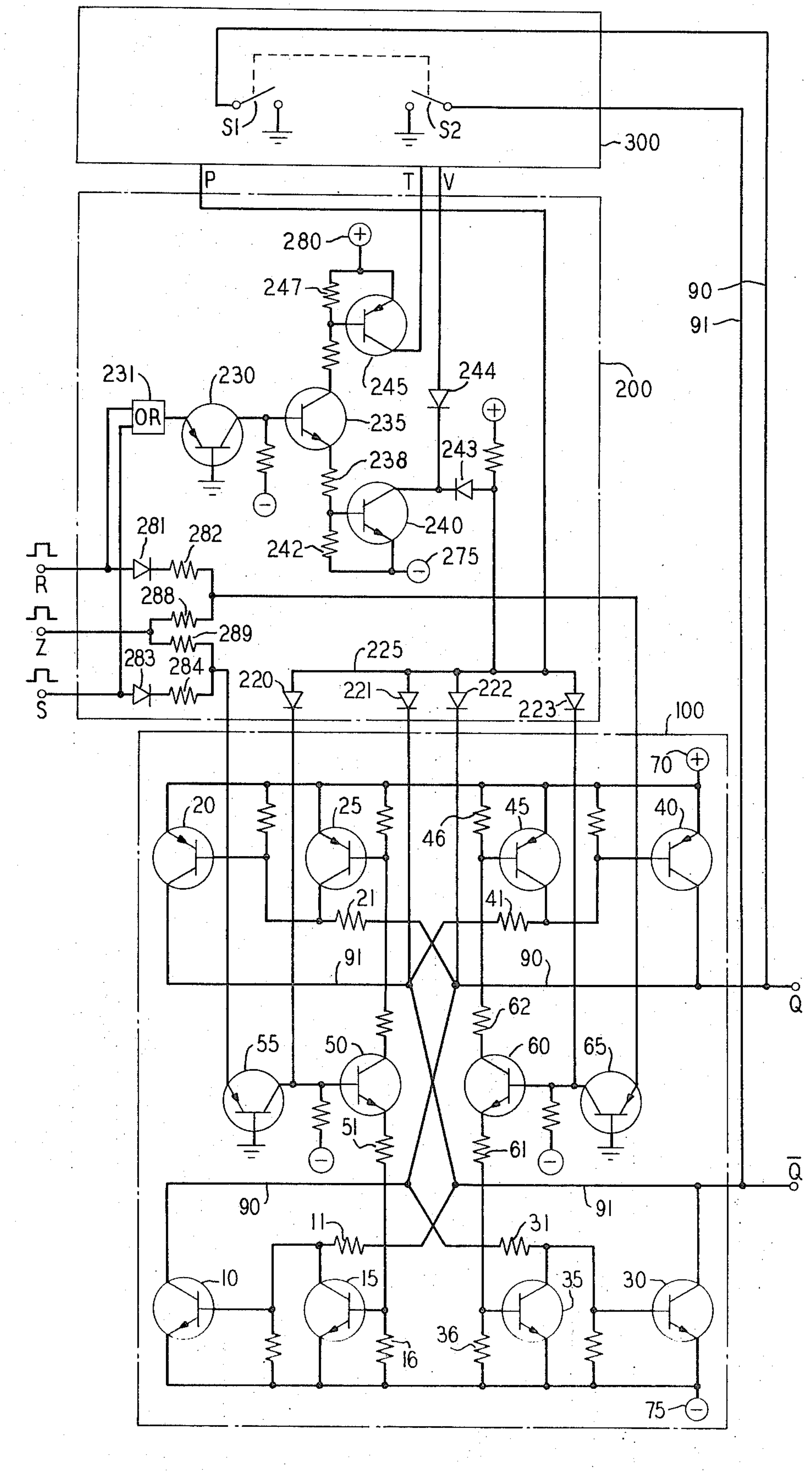
FIG. 1 shows an illustrative embodiment of a ternary cell in accordance with the invention.

The ternary cell in FIG. 1 comprises complementary cell 100, logic circuit 200 and switching circuit 300. Complementary cell 100 is a known regenerative circuit normally having two binary states, designated the set and reset states. Logic circuit 200 includes a novel circuit arrangement, in accordance with a feature of my invention, for providing cell 100 with a third, stable state. Switching circuit 300 provides low output impedance for cell 100 in its third state, in accordance with another feature of my invention.

Complementary cell 100 is comprised of transistors 10 and 30 which are of the npn conductivity type and transistors 20 and 40 which are of the pnp conductivity type. Cebl 100 is powered by positive source 70 and negative source 75, illustratively of equal magnitude. The potentials of sources 70 and 75 herein referred to as "positive potential" and "negative potential," respectively, define two of the three levels which the data signal stored by the present ternary cell can assume.

In the reset state of cell 100, transistors 10 and 20, comprising a first complementary transistor pair, are conductive, each of these being supplied with base current from the collector of the other via resistors 11 and 21, respectively. Transistors 30 and 40, comprising a second complementary transistor pair, are held nonconductive in the reset state by resistors 31 and 41, which connect the bases of transistors 30 and 40 to the collectors of transistors 10 and 20, respectively. In the reset state, the potential of source 75 is extended to output terminal Q via transistor 10 and output bus 90, while the potential of source 70 is extended to complementing or "not" output terminal $\overline{Q}$ via transistor 20 and output bus 91.

Conversely, transistors 30 and 40 are conductive and transistors 10 and 20 nonconductive in the set state of cell 100, and the potentials of sources 70 and 75 are respectively extended to terminals Q and $\overline{Q}$ via output buses 90 and 91.

Various arrangements for switching a complementary cell such as cell 100, between its set and reset states are known in the art. For example, in my U. S. Pat. No. 3,679,914 issued on July 25, 1972 a complementary cell is switched from one of its binary states to the other by concurrently clamping nonconductive each transistor of the conductive pair associated with that state. A positive feedback loop is established within the cell, whereby the originally nonconductive transistor pair become conductive and a state transition is effected.

Set-reset triggering circuitry substantially identical to that disclosed in the above-mentioned patent is illustratively employed in complementary cell 100. Specifically, circuitry for switching cell 100 to the reset state, for example, includes transistors 35, 45, 60 and 65. A positive reset triggering signal at reset terminal R is extended to the emitter of transistor 65 via diode 281 and resistor 282 of logic circuit 200. As transistor 65 conducts, its collector and the base of transistor 60 approach ground. Transistor 60 becomes forward biased since negative potential is extended to its emitter from source 75 via resistors 36 and 61. Current flows from source 70 to source 75 via resistors 46 and 62, transistor 60, and resistors 61 and 36. The resultant drop across resistors 36 and 46 causes concurrent saturation of clamping transistors 35 and 45, which concurrently clamp transistors 30 and 40 nonconductive. With transistors 30 and 40 nonconductive, transistors 10 and 20 become conductive via positive feedback and cell 100 is transferred to its reset state.

Similar circuitry including transistors 15, 25, 50 and 55 is operative in response to a positive set triggering signal at set terminal S for concurrently clamping transistors 10 and 20 nonconductive, thereby transferring cell 100 to the set state. Set signals are extended from terminal S to transistor 55 via diode 283 and resistor 284 of logic circuit 200.

In accordance with my invention, cell 100 is switched into its third, stable state, herein referred to as the Z state, by a positive triggering signal at terminal Z. The Z state is characterized by concurrent nonconduction of transistors 10, 20, 30 and 40. In operation, the signal at terminal Z is extended to the emitters of transistors 55 and 65 via resistors 288 and 289, respectively, of logic circuit 200. Clamping transistors 15, 25, 35 and 45 are rendered conductive, and transistors 10, 20, 30 and 40 are all clamped nonconductive.

Cell 100 is horizontally and vertically symmetric, so that when transistors 10, 20, 30 and 40 are all nonconductive in the Z state, the potential on both buses 90 and 91 is substantially halfway between sources 70 and 75. Since these sources illustratively have equal magnitude, the Z state output level at both output terminals Q and $\overline{Q}$ is substantially ground potential. (Where desired switching circuit 300 may advantageously operate as discussed below to provide a Z state output level other than ground.)

In complementary cell arrangements known heretofore, the Z state is unstable. That is, if both transistor pairs are rendered nonconductive (as above) and then released, one pair will become conductive and the cell will arbitrarily assume either its set or reset state. However, the Z state of cell 100 is made stable, in accordance with a feature of my invention, by latching circuitry illustratively including the four diodes 220–223 of logic circuit 200. The anodes of diodes 220–223 are connected in common to diode bus 225. The cathodes of diodes 220 and 223 are connected to the bases of transistors 50 and 60, respectively, while the cathodes of diodes 221 and 222 are respectively connected to output buses 91 and 90.

As long as cell 100 is in the set or reset state, one of the output buses 90 and 91 is at negative potential. Diode bus 225 is provided with negative potential via diode 221 or diode 222, depending on the cell state. Since negative potential is extended to transistor 50 via resistors 16 and 51 and to transistor 60 via resistors 36 and 61, diodes 220 and 223, and hence transistors 50 and 60 are nonconductive.

However, when a triggering signal at terminal Z switches transistors 10, 20, 30 and 40 all nonconductive, the respective voltages on output buses 90 and 91 both become substantially equal to a potential halfway between sources 70 and 75 as mentioned above. In the illustrative embodiment, this potential is ground. Accordingly, ground potential is extended to diode bus 225 via diodes 221 and 222 and therefore to the bases of transistors 50 and 60 via diodes 220 and 223, respectively. Thus, even when transistors 55 and 65 become nonconductive upon termination of the signal at terminal Z, the bases of transistors 50 and 60 remain at ground. Transistors 50 and 60 and hence clamping transistors 15, 25, 35 and 45 remain conductive. Transistors 10, 20, 30 and 40 are latched nonconductive and cell 100 is latched in the Z state.

Inhibiting circuitry including transistors 230, 235 and 240 in logic circuit 200, operates in response to signals at terminal S and at terminal R to unlatch cell 100 from the Z state, by inhibiting further operation of the above-described latching circuitry. In operation, set and reset signals from terminals S and R respectively are coupled to OR circuit 231. The latter illustratively comprises a standard OR gate so that transistor 230 is forward biased when a signal is applied at terminal S, at terminal R, or at both concurrently.

As transistor 230 conducts, its collector and the base of transistor 235 approach ground. Transistor 235 is forward biased, the negative potential of source 275 being extended to its emitter via resistors 242 and 238. The drop across resistor 242 due to current flow in transistor 235, forward biases transistor 240. (Similarly, the drop across resistor 247 forward biases transistor 245, the function of which is discussed hereinbelow.) Since transistor 240 is conductive, the negative potential of source 275 is extended to diode bus 225 via diode 243. Source 275 is illustratively equal in magnitude to source 75. Thus, diodes 220 and 223 become nonconductive and transistors 50 and 60 are returned to the control of transistors 55 and 65.

In addition to unlatching cell 100 from the Z state in response to set and reset triggering signals, the above-described inhibiting circuitry also advantageously prevents cell 100 from erroneously latching in the Z state during transitions between the set and reset states. Such erroneous latching might otherwise occur because output buses 90 and 91 both pass through ground potential during transitions between the set and reset states. This would tend to raise diode bus 225 to ground and forward bias transistors 50 and 60 via diodes 220 and 223 respectively.

However, as long as signals at terminals S and/or R persist through transition periods between the set and reset states, transistors 230, 235 and 240 remain conductive. The negative potential of source 275 is maintained on diode bus 225, and since diodes 220 and 223 are thus nonconductive, cell 100 cannot latch in the Z state.

When, as assumed above, OR circuit 231 comprises a standard OR gate, cell 100 is prevented from erroneously latching in the Z state in response to concurrent set and reset triggering signals, which will cause concurrent nonconduction in transistors 10, 20, 30 and 40. However, in some applications it may be desired to trigger cell 100 into the Z state in just this way, i.e., via concurrent signals at terminals S and R, thereby obviating the need for terminal Z and resistors 288 and 289. In such applications, OR circuit 231 may advantageously comprise an exclusive OR gate so that the above-described inhibiting circuitry will operate exclusively in response to nonconcurrent signals at terminals S and R.

When cell 100 is in either its set or reset state, output buses 90 and 91 are each connected to positive or negative potential via a saturated transistor pair. Hence the output impedance at output terminals Q and $\overline{Q}$ is very low. In the Z state, however, transistors 10, 20, 30 and 40 are all nonconductive. The output impedance of cell 100 is then a function of its internal resistors and may be undesirably large for certain applications.

In accordance with a further feature of my invention, cell 100 is provided with low output impedance in the Z state by switching circuit 300, which includes tandemly operated switches S1 and S2. The latter are operative during the Z state for connecting output buses 90 and 91 via low impedance paths to a potential defining the Z state output voltage level. This may be ground potential, which, as discussed above, is substantially the output voltage level cell 100 normally assumes in its third state (although at a higher impedance level) or it may be another predetermined potential between sources 70 and 75.

Switches S1 and S2 operate when the potential on diode bus 225, extended to circuit 300 via lead P is substantially ground, diode bus 225 being at ground potential only when cell 100 is in the Z state. This arrangement insures that switches S1 and S2 close only after transistors 10, 20, 30 and 40 are all nonconductive and thus avoids inadvertent shorting of source 70 or source 75 via one of those transistors.

Figure 2:
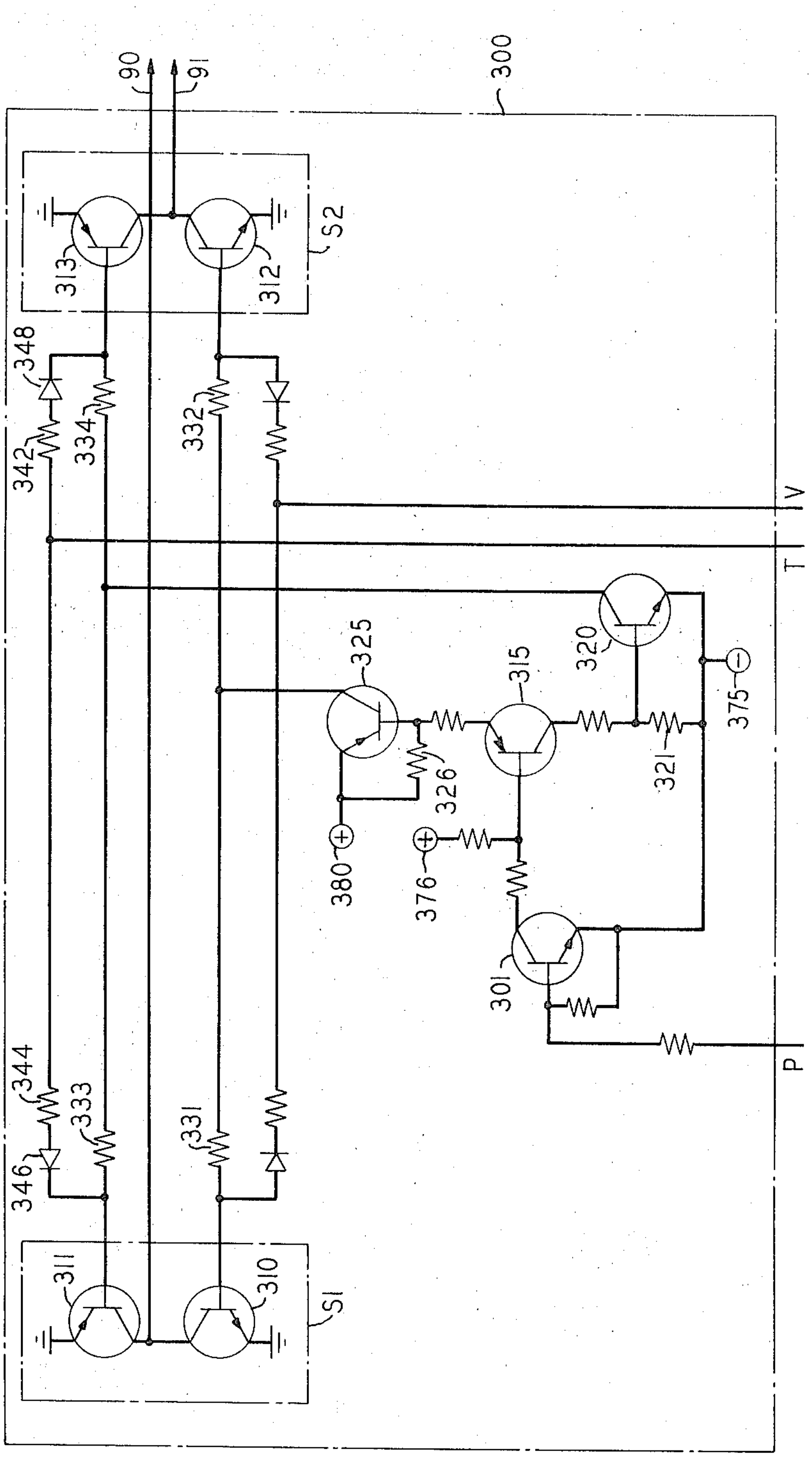
FIG. 2 shows an illustrative embodiment of a switching circuit which can be utilized in the ternary cell of FIG. 1 to provide the cell with low output impedance in its third state.

An illustrative embodiment of switching circuit 300 is shown in FIG. 2. Switch S1 comprises in FIG. 2 grounded emitter complementary transistor pair 310 and 311. The collectors of transistors 310 and 311 are connected in common to output bus 90. Since transistor 310 is of the npn type, while transistor 311 is of the pnp type, output bus 90 advantageously has both positive and negative current capability during the Z state. Similar capability is provided to output bus 91 by switch S2. Illustratively, switch S2, comprising transistors 312 and 313, is substantially identical to switch S1. Of course, where both positive and negative current capability is not required, or where the Z-state output level at one or both of terminals Q and $\overline{Q}$ is to be other than ground, alternative circuit arrangements for switches S1 and S2, which will be obvious to those skilled in the art, may be utilized.

As long as diode bus 225 and hence lead P, are at negative potential, indicating that cell 100 is not in the Z state, transistor 301 is nonconductive. The positive potential of source 376 maintains transistor 315, and hence transistors 320 and 325 nonconductive. No base drive is provided to transistors 310–313. Switches S1 and S2 are therefore open.

However, when the potential on lead P is substantially ground, i.e. when cell 100 is in the Z state, transistors 301, 315, 320 and 325 are all conductive. The potential of positive source 380 is extended through transistor 325 to forward bias transistors 310 and 312 via resistors 331 and 332. The potential of negative source 375 is extended through transistor 320 to forward bias transistors 311 and 313 via resistors 333 and 334. Switches S1 and S2 are thus closed to provide low impedance paths between output buses 90 and 91 and ground.

When cell 100 is triggered from its Z state to its set or reset state, transistors 310–313 are again rendered nonconductive. However, as a result of hole storage in transistors 310–313, one or more of them may still be turning off as a complementary pair in cell 100 begins to turn on. A momentary short circuit will thus be created between sources 70 and 75 or between one of these sources and ground, leading to possible transistor and/or power supply damage.

Such damage is minimized by extending reverse biasing signals to transistors 310–313 in response to signals at terminals S and R. Specifically, positive turn-off signals are extended to transistors 311 and 313 from source 280 via transistor 245 and lead T. Lead T is connected to the base of transistor 311 via resistor 344 and diode 346 and to the base of transistor 313 via resistor 342 and diode 348. Negative turn-off signals are similarly coupled to transistors 310 and 312 from source 275 via transistor 240, isolation diode 244 and lead V.

Although the present invention has been illustrated in conjunction with a complementary cell in which both binary states are stable, it will be appreciated by those skilled in the art that the invention can also be utilized to provide a third state in a complementary cell in which one or both of the binary states are unstable. Such complementary cells are disclosed, for example, in the above-cited U. S. patent and also in T. P. Bothwell U.S. Pat. 2,948,820 issued on Aug. 9, 1960.

Thus, it is to be understood that the specific embodiments disclosed herein are merely llustrative of the principles of my invention. Numerous other arrangements in accordance with those principles may readily be devised by those skilled in the art without departing from the spirit and scope of the invention.

I claim:

1. In combination, a regenerative circuit having first and second states comprising, a first complementary transistor pair, a second complementary transistor pair, means including direct current paths for interconnecting said first transistor pair with said second transistor pair such that said first and second transistor pairs are conductive in said first and second states respectively and such that each of said pairs is normally switched conductive when the other of said pairs is switched nonconductive, and circuit means for providing said regenerative circuit with a third, stable state in which both of said first and second transistor pairs are latched nonconductive, said circuit means including means for clamping said first and second transistor pairs nonconductive and latching means normally operative in response to concurrent nonconduction of said first and second transistor pairs for maintaining said clamping means operated.

2. In combination, a regenerative circuit having first and second states comprising, a first complementary transistor pair, a second complementary transistor pair, means including direct current paths for interconnecting said first transistor pair with said second transistor pair such that said first and second transistor pairs are conductive in said first and second states respectively and such that each of said pairs is normally switched conductive when the other of said pairs is switched nonconductive, circuit means for providing said regenerative circuit with a third, stable state in which both of said first and second transistor pairs are latched nonconductive, said circuit means including means for clamping said first and second transistor pairs nonconductive and latching means normally operative in response to concurrent nonconduction of said first and second transistor pairs for maintaining said clamping means operated, and triggering means for switching said regenerative circuit to said first and to said second states in responsive to first and second triggering signals respectively, and means responsive to said first triggering signal and to said second triggering signal for inhibiting operation of said latching means.

3. The combination of claim 2 further comprising an output terminal connected to a transistor of one of said transistor pairs, and means operative when said regenerative circuit is in said third state for connecting said output terminal to a predetermined potential via a low impedance path.

4. In combination, a regenerative circuit having first and second states comprising, a first complementary transistor pair, a second complementary transistor pair, means including direct current paths for interconnecting said first transistor pair with said second transistor pair such that said first and second transistor pairs are conductive in said first and second states respectively and such that each of said pairs is normally switched conductive when the other of said pairs is switched nonconductive, circuit means for providing said regenerative circuit with a third, stable state in which both of said first and second transistor pairs are latched nonconductive, said circuit means including means for clamping said first and second transistor pairs nonconductive and latching means normally operative in response to concurrent nonconduction of said first and second transistor pairs for maintaining said clamping means operated, and triggering means for switching said regenerative circuit to said first and to said second states in response to first and second triggering signals respectively, and means responsive exclusively to nonconcurrent ones of said first and second triggering signals for inhibiting operation of said latching means.

5. A complementary cell having first and second states comprising, a first complementary transistor pair, a second complementary transistor pair, means including direct current paths for interconnecting said first transistor pair with said second transistor pair such that said first and second transistor pairs are conductive in said first and second states respectively, and such that each of said pairs is normally switched conductive after the other of said pairs is switched nonconductive, and means responsive to a predetermined triggering signal for switching a conductive one of said first and second transistor pairs nonconductive, the improvement comprising; means normally operative in response to concurrent nonconduction of said first and second transistor pairs for latching said first and second transistor pairs to maintain them nonconductive upon termination of said predetermined signal, whereby said cell is provided with a third, stable state.

6. A complementary cell having first and second states comprising, a first complementary transistor pair, a second complementary transistor pair, means including direct current paths for interconnecting said first transistor pair with said second transistor pair such that said first and second transistor pairs are conductive in said first and second states respectively, and such that each of said pairs is normally switched conductive after the other of said pairs is switched nonconductive, means responsive to a predetermined triggering signal for switching a conductive one of said first and second transistor pairs nonconductive, means normally operative in response to concurrent nonconduction of said first and second transistor pairs for latching said first and second transistor pairs to maintain them nonconductive upon termination of said predetermined signal, triggering means for switching said cell to said first and to said second states in response to first and second triggering signals respectively, and means responsive to said first triggering signal and to said second triggering signal for inhibiting operation of said latching means.

7. A ternary cell comprising first and third transistors of a first conductivity type and second and fourth transistors of a second conductivity type, first and second output buses, means for connecting the collectors of said first and fourth transistors to said first bus and their bases to said second bus, means for connecting the collectors of said second and third transistors to said second bus and their bases to said first bus, clamping means operative for maintaining all of said transistors concurrently nonconductive, and latching means operative in response to concurrent nonconduction in all of said transistors for operating said clamping means.

8. A ternary cell in accordance with claim 7 further comprising, means for coupling the emitters of said first and third transistors to a first potential, and means for coupling the emitters of said second and fourth transistors to a second potential and wherein said latching means comprises means normally operative for operating said clamping means when the potentials on said first and second buses are both substantially equal to a third potential halfway between said first and second potentials.

9. A ternary cell in accordance with claim 8 wherein said clamping means includes first and second clamping circuits respectively operative for maintaining said first and second and said third and fourth transistors nonconductive, wherein each of said clamping circuits is operative in response to a signal at said third potential, and wherein said latching means includes a diode bus and first, second, third and fourth diodes, the anodes of all of said diodes being connected to said diode bus, the cathodes of said first and fourth diodes being connected to said clamping circuits, and the cathodes of said second and third diodes being connected to said first and second output buses, respectively.

10. A ternary cell in accordance with claim 7 wherein said clamping means includes first and second clamping circuits respectively operative for maintaining said first and second and said third and fourth transistors nonconductive; said cell further comprising means for operating said first and second clamping circuits in response to first and second triggering signals, respectively, and means for concurrently operating said first and second clamping circuits in response to a third triggering signal.

11. A ternary cell in accordance with claim 10 further comprising means for inhibiting operation of said latching means in response to said first triggering signal and to said second triggering signal.

* * * * *